US012794589B2

(12) United States Patent
Kim

(10) Patent No.: US 12,794,589 B2
(45) Date of Patent: Nov. 10, 2026

(54) ELECTRONIC DEVICE FOR TRANSMITTING DATA AND CORRECTING ERROR IN RECEIVED DATA

(71) Applicant: Samsung Electronics Co., Ltd., Suwon-si (KR)

(72) Inventor: Hoyoun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/045,213

(22) Filed: Feb. 4, 2025

(65) Prior Publication Data

US 2026/0025232 A1 Jan. 22, 2026

(30) Foreign Application Priority Data

Jul. 19, 2024 (KR) ........................ 10-2024-0095415

(51) Int. Cl.
*H04L 1/00* (2006.01)

(52) U.S. Cl.
CPC .......... *H04L 1/0061* (2013.01); *H04L 1/0072* (2013.01)

(58) Field of Classification Search
None
See application file for complete search history.

(56) References Cited

U.S. PATENT DOCUMENTS 6,128,760 A * 10/2000 Poeppleman ......... H03M 13/09 708/492
8,099,651 B2 1/2012 Normoyle et al.
11,720,440 B2 8/2023 Cherukuri et al.
(Continued)

FOREIGN PATENT DOCUMENTS

EP 3292653 A1 3/2018
KR 20230049537 A 4/2023
(Continued)

OTHER PUBLICATIONS

Arifin st. al, "Design and Implementation of High Performance Parallel CRC Architecture for Advanced Data Communication," 2019 4th International Conference on Electrical Information and Communication Technology (EICT), Khulna, Bangladesh, 2019, pp. 1-5 (Year: 2019).*

*Primary Examiner* — Daniel F. McMahon
(74) *Attorney, Agent, or Firm* — Wolf, Greenfield & Sacks, P.C.

(57) ABSTRACT

An electronic memory device includes a CRC checker configured to receive reception data and a cyclic redundancy check (CRC) codeword including a reception CRC code, to derive a comparison CRC code from the reception data, and to determine whether the reception CRC code and the comparison CRC code are the same; and an error position estimation data sampler configured to sample error position estimation data indicative of an estimated position of an error in the reception data and to transmit the error position estimation data to the CRC checker when the reception CRC code and the comparison CRC code are not the same, wherein the CRC checker recalculates the comparison CRC code as a function of the error position estimation data, and corrects the error in the reception data reflected by the error position estimation data when the reception CRC code and the recalculated comparison CRC code match.

20 Claims, 11 Drawing Sheets

(56) References Cited

U.S. PATENT DOCUMENTS

| | | | | |
|---|---|---|---|---|
| 2001/0056563 | A1* | 12/2001 | Kodama | H03M 13/091 714/701 |
| 2003/0023929 | A1* | 1/2003 | Kajita | H04L 1/0006 714/781 |
| 2010/0031124 | A1* | 2/2010 | Shinagawa | H03M 13/6516 714/781 |
| 2012/0117443 | A1* | 5/2012 | Lee | H04L 1/0061 714/E11.03 |
| 2014/0189474 | A1 | 7/2014 | Kwan | |
| 2015/0172000 | A1* | 6/2015 | Alliot | H04L 1/0054 375/341 |
| 2015/0278008 | A1* | 10/2015 | Ren | H04L 1/0045 714/776 |
| 2015/0349798 | A1* | 12/2015 | Wang | H03M 13/29 714/773 |
| 2018/0287736 | A1* | 10/2018 | Ren | H04L 1/0045 |
| 2019/0097760 | A1* | 3/2019 | Hwang | H04L 1/0052 |
| 2022/0116057 | A1 | 4/2022 | Doubchak et al. | |

FOREIGN PATENT DOCUMENTS

| | | | |
|---|---|---|---|
| KR | 102611828 | B1 | 12/2023 |
| WO | 2016177385 | A1 | 11/2016 |

* cited by examiner

| Error Position Estimation Data (EPED) | Probability of Error |
|---|---|
| EPED1 | High ↑ |
| ⋮ | ↕ |
| EPEDN | ↓ Low |

FIG. 4

| CRC Code Length | N-bit Data | CRC Polynomial | K-bit Data |
|---|---|---|---|
| 16bit | 1111111111111111 | $\chi^{16}+\chi^{15}+\chi^{2}+1$ | 1000000000000101 |
| 8bit | 0000000011111111 | $\chi^{8}+\chi^{2}+\chi+1$ | 00000111 |
| 4bit | 0000000000001111 | $\chi^{4}+\chi^{3}+\chi^{2}+\chi+1$ | 1111 |

FIG. 10

ELECTRONIC DEVICE FOR TRANSMITTING DATA AND CORRECTING ERROR IN RECEIVED DATA

CROSS-REFERENCE TO RELATED APPLICATION(S)

This application claims the benefit of priority under 35 U.S.C. § 119 to Korean Patent Application No. 10-2024-0095415 filed on Jul. 19, 2024 in the Korean Intellectual Property Office, the disclosure of which is incorporated herein by reference in its entirety.

BACKGROUND

Example embodiments of the present disclosure relate generally to an electronic device, and, more particularly, to an electronic device for transmitting data and correcting errors in received data.

Memory devices, such as a memory device, a processor, and a display included in an electronic memory device may transmit data to each other. During data transmission, errors may occur in a portion of data due to noise, among other factors. A cyclic redundancy check (CRC) may be used as one error detection method. The cyclic redundancy check may determine whether an error has occurred in data using a CRC polynomial and a CRC code.

SUMMARY

An example embodiment of the present disclosure provides an electronic memory device which may detect errors in data using a CRC code, may also correct detected errors and may change a length of the CRC code.

According to an example embodiment of the present disclosure, an electronic memory device includes a CRC checker configured to receive reception data and a CRC codeword including a reception cyclic redundancy check (CRC) code, to derive a comparison CRC code from the reception data, and to determine whether the reception CRC code and the comparison CRC code are the same; and an error position estimation data sampler configured to sample error position estimation data and to transmit the data to the CRC checker when the reception CRC code and the comparison CRC code are not the same, wherein the CRC checker recalculates the comparison CRC code by reflecting the error position estimation data in the reception data, and corrects an error in the reception data by reflecting the error position estimation data in the reception data when the reception CRC code and the recalculated comparison CRC code are the same.

According to an example embodiment of the present disclosure, an electronic memory device includes a linear feedback shift register (LFSR) including an N number of exclusive-OR (XOR) gates, an N number of flip-flops, an N number of first switches, an (N−1) number of second switches and a third switch between a transmission data input terminal and a transmission CRC code output terminal, wherein the N number of XOR gates, the N number of flip-flops, and the (N−1) number of second switches are connected to each other alternately, where N is a natural number; a bit data generator configured to output N-bit data controlling a degree K of a CRC polynomial and K-bit data according to values of a coefficient of the CRC polynomial, where K is a natural number, wherein each of the N number of first switches, when enabled, connects the CRC code output terminal to a corresponding XOR gate among the N number of XOR gates, wherein each of the (N−1) number of second switches connects an output terminal of an adjacent flip-flop among the N number of flip-flops to an input terminal of an adjacent XOR gate among the N number of XOR gates in a first on-state, and connects an output terminal of the adjacent flip-flop to a first node in a second on-state, wherein the third switch, when enabled, connects the first node to the CRC code output terminal, and wherein the linear feedback shift register is configured to control states of the N number of first switches, the (N−1) number of second switches, and the third switch, and to derive the transmission CRC code from the transmission data by controlling a state of at least one first switch among the N number of first switches, which is in an on-state, by the N-bit data.

According to an example embodiment of the present disclosure, an electronic memory device includes a reception portion configured to receive a plurality of data blocks; a data block reassembly portion configured to classify the plurality of data blocks into at least one first data block, a second data block including a reception CRC code corresponding to the first data block, and at least one third data block; and a CRC decoder configured to generate a comparison CRC code from the first data block, and to determine whether the first data block includes an error by comparing the reception CRC code with the comparison CRC code, wherein, when the reception CRC code and the comparison CRC code are not the same, the CRC decoder samples an error position estimation data block, and recalculates the comparison CRC code as a function of information in the error position estimation data block, and wherein, when the reception CRC code and the recalculated comparison CRC code are the same, the CRC decoder corrects an error in the first data block as a function of the information in the error position estimation data block.

BRIEF DESCRIPTION OF DRAWINGS

The above and other aspects, features, and advantages of the present disclosure will be more clearly understood from the following detailed description, taken in combination with the accompanying drawings, wherein like reference numerals (when used) indicate corresponding elements throughout the several views, and in which:

FIG. 4 is a diagram conceptually illustrating pieces of error position estimation data according to an example embodiment of the present disclosure;

FIG. 10 is a diagram conceptually illustrating N-bit data and K-bit data according to example embodiments of the present disclosure;

DETAILED DESCRIPTION

In the description below, embodiments of the present disclosure will be described as follows with reference to the accompanying drawings.

Figure 1:
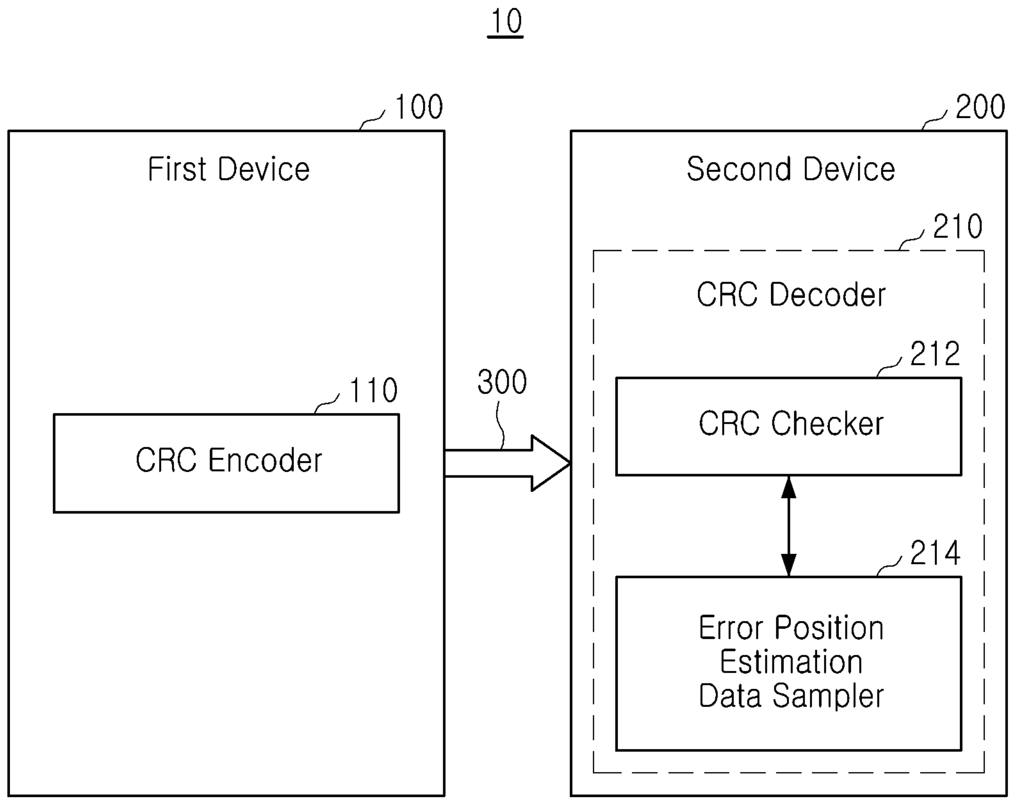
FIG. 1 is a schematic block diagram illustrating an electronic memory device according to an example embodiment of the present disclosure.
Figure 2:
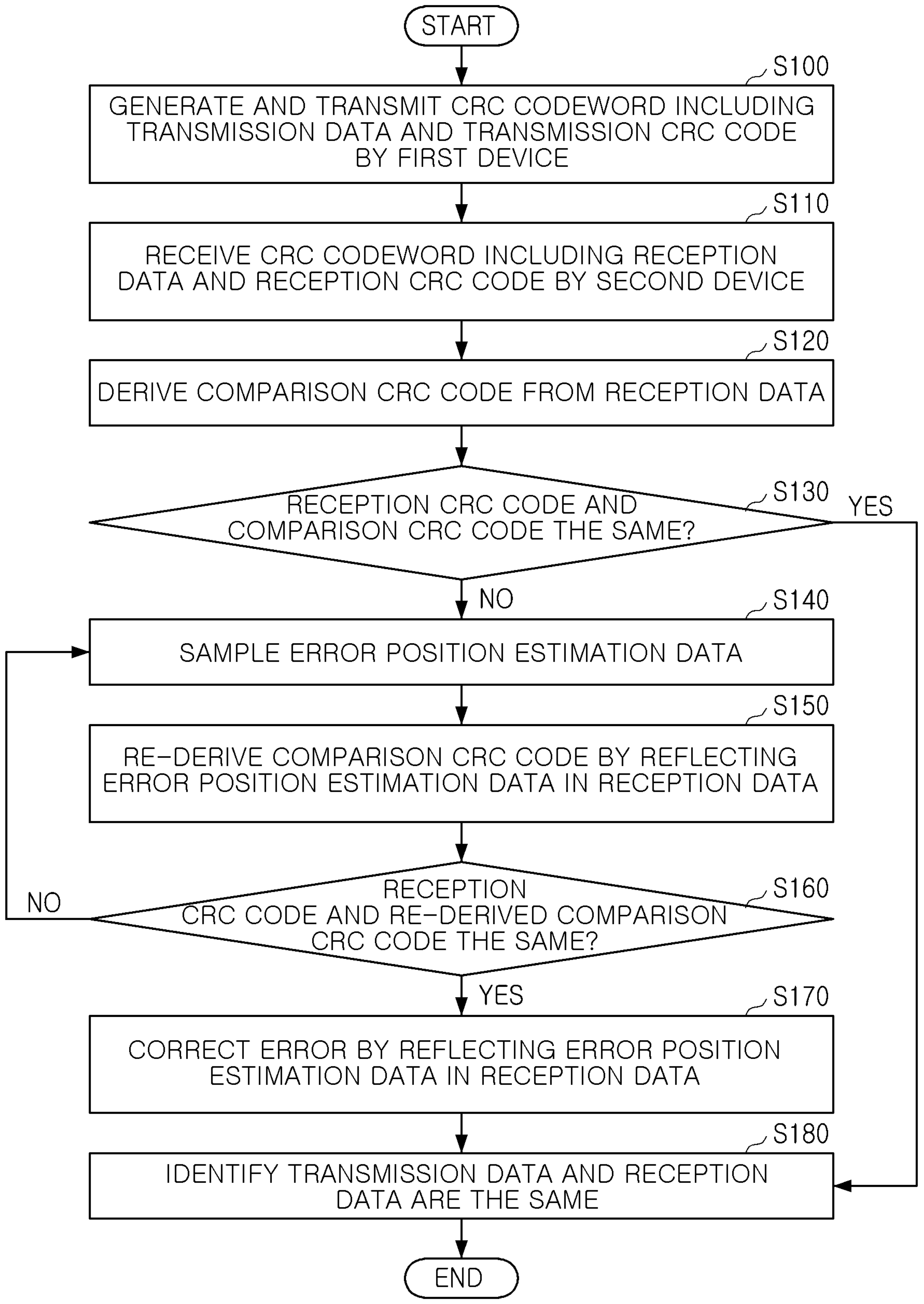
FIG. 2 is a flowchart illustrating an operation of determining whether an error has occurred in transmitted data of an electronic memory device according to an example embodiment of the present disclosure.

FIG. 1 is a schematic block diagram illustrating an electronic memory device according to an example embodiment. FIG. 2 is a flowchart illustrating an operation of determining whether an error has occurred in transmitted data of an electronic memory device according to an example embodiment.

Referring to FIG. 1, an electronic memory device 10 according to an example embodiment may include a first memory device 100, a second memory device 200, and a channel 300 (e.g., data bus or other communication connection).

The electronic memory device 10 may be implemented, for example, as one of a smartphone, a tablet PC, a smart TV, a mobile phone, a personal digital assistant (PDA), a laptop, a media player, a micro server, a global positioning system (GPS) memory device, an e-book reader, a digital broadcasting terminal, a navigation device, a kiosk, an MP3 player, a digital camera, a home appliance, and other mobile or non-mobile computing memory devices.

Also, the electronic memory device 10 may be implemented as a wearable device such as, for example, a watch, glasses, a hair band, and a ring having a data processing functionality. The electronic memory device 10 may include devices operating based on an operating system (OS) using a processor. However, the electronic memory device 10 may not be limited thereto.

The first memory device 100 and the second memory device 200 may be one of a plurality of memory devices generally included in the electronic memory device 10, such as a central processing unit (CPU), a graphics processing unit (GPU), an application processor (AP), a dynamic random-access memory (DRAM), a nonvolatile memory device, a memory controller, a display, or the like, included in the electronic memory device 10.

The first memory device 100 may transmit data (i.e., transmission data) to the second memory device 200 through the channel 300. In this case, the first memory device 100 may be referred to as a transmission memory device. The transmission data may be data which the first memory device 100 intends to transmit to the second memory device 200, and the transmission data may be, for example, a bit stream.

Referring to FIGS. 1 and 2 together, the first memory device 100 may include a cyclic redundancy check (CRC) encoder 110. The CRC encoder 110 may generate and transmit a CRC codeword including transmission data and a transmission CRC code (S100 in FIG. 2). Specifically, the CRC encoder 110 may generate a transmission CRC code from the transmission data and may generate a CRC codeword by adding the transmission CRC code to the transmission data. The transmission CRC code may be used to detect whether an error has occurred during transmission of the transmission data.

As an example embodiment, the CRC encoder 110 may add a bit stream consisting of "0" to the end of the transmission data and may divide the data by a CRC polynomial, thereby generating a remainder. The bit stream corresponding to a remainder may be referred to as a transmission CRC code. The CRC encoder 110 may generate a CRC codeword by adding the transmission CRC code to the end of the transmission data.

The first memory device 100 may further include a transmitter (not explicitly illustrated, but implied). The transmitter may transmit the CRC codeword generated by the CRC encoder 110 to the second memory device 200 through the channel 300. The transmitter may be configured to format the transmission data using a protocol recognized by the second memory device 200.

The channel 300 may be used as a data transmission path between the first memory device 100 and the second memory device 200. The channel 300 may transfer a plurality of CRC codewords transmitted from the first memory device 100 to the second memory device 200.

The channel 300 may include one or more lanes. A plurality of CRC codewords transmitted from the first memory device 100 may be transmitted to the second memory device 200 through one or more lanes. The first memory device 100 may interleave the plurality of CRC codewords to correspond to the number of lanes included in the channel 300 and may output the plurality of CRC codewords to one or more lanes. Different types of information (e.g., data or control information) may be transmitted, in parallel, over different respective lanes of the channel 300. Also, the first memory device 100 may share a CRC polynomial with the second memory device 200 through the channel 300.

When the plurality of CRC codewords are transmitted from the first memory device 100 to the second memory device 200 through the channel 300, an error may occur in a portion of the transmission data. For example, at least one bit at a specific position among the data bits included in the transmission data may be flipped (e.g., from a logic "0" to a logic "1," or vice versa). Such an error may be referred to as a transmit error, a transmission error, or a channel error.

The second memory device 200 may include a receiver (not explicitly illustrated, but implied). The receiver may be configured to receive a plurality of CRC codewords transmitted from the first memory device 100 through the channel 300. Accordingly, the second memory device 200 may be referred to as a reception memory device. However, in the electronic memory device 10, the first memory device 100 is not limited to the transmission memory device and the second memory device 200 is not limited to the reception memory device. For example, the second memory device 200 may generate transmission data and the transmission CRC code, and may transmit the transmission data and the transmission CRC code to the first memory device 100 through the channel 300; that is, the channel 300 may be a bidirectional channel.

Specifically, the second memory device 200 may receive the CRC codeword including reception data and a reception CRC code (S110 in FIG. 2). The reception data may correspond to the transmission data, and the reception CRC code may correspond to the transmission CRC code. For example, the reception CRC code may be the same as the transmission CRC code (e.g., when there are no errors in the transmitted data).

The second memory device 200 may include a CRC decoder 210. The CRC decoder 210 may include a CRC checker 212 and an error position estimation data sampler 214. The CRC decoder 210 may be configured to determine whether the reception data may contain an error and correct the detected error (S130 to S180 in FIG. 2).

In an example embodiment, the CRC checker 212 may determine whether the reception data includes an error. The CRC checker 212 may derive a comparison CRC code from the reception data (S120). The CRC checker 212 may add a bit stream consisting of "0" to the end of the reception data and may divide the data by a CRC polynomial shared from the first memory device 100, thereby deriving a remainder. The bit stream corresponding to the remainder may be referred to as a comparison CRC code.

The CRC checker 212 may determine whether the reception CRC code and the comparison CRC code are the same (S130). When the reception CRC code and the comparison CRC code are the same (YES of S130), the CRC checker 212 may identify that no error is present in the reception data. In other words, the transmission data and the reception data may be identified as the same (S180); that is, the transmission data matches the reception data, at which point the method ends.

When the reception CRC code and the comparison CRC code are not the same (NO of S130), the CRC checker 212 may identify that an error is present in the reception data. In other words, the CRC checker 212 may detect whether an error occurs during transmission of transmission data through binary-based computation, among other means.

However, a general CRC checker may not accurately determine which position of the data bits of the transmission data has an error. That is, it may be difficult to correct an error in transmission data using only the CRC check result.

For example, an adapter included in a chiplet in a short-distance wired environment may only detect whether an error occurs during transmission of transmission data. In a short-distance wired environment of a chiplet, there may be a high possibility that an error occurs in a 1 bit of transmission data. To correct the 1-bit error, an error correction code (ECC) may need to be provided.

The CRC decoder 210 in an example embodiment may be configured to correct an error occurring in data using the CRC code. Specifically, the CRC decoder 210 may perform processes (S140 to S180) of correcting an error using error position estimation data. Accordingly, an error in transmission data may be corrected without having an error correction code (ECC). Accordingly, an overhead of data may be reduced.

The error position estimation data sampler 214 may sample error position estimation data (S140). In an example embodiment, the error position estimation data sampler 214 may select a piece of data from a plurality of pieces of data as error position estimation data based on a probability of error in each bit position of reception data. In another example embodiment, the error position estimation data sampler 214 may perform a specific computation and may generate error position estimation data.

The error position estimation data sampler 214 may transmit the sampled error position estimation data to the CRC checker 212. The CRC checker 212 may recalculate the comparison CRC code by reflecting the error position estimation data to the reception data (S150); that is, the CRC checker 212 may be configured to recalculate the comparison CRC code as a function of the error position estimation data. For example, the CRC checker 212 may flip a bit at a position at which a bit of the error position estimation data in reception data is "1," and may recalculate the comparison CRC code from the bit-flipped reception data.

The CRC checker 212 may determine whether the reception CRC code and the recalculated (i.e., re-derived) comparison CRC code are the same (S160). When the reception CRC code and the recalculated comparison CRC code are not the same (NO of S160), the processes of sampling error position estimation data, recalculating the comparison CRC code, and comparing the code with the reception CRC code (S140 to S160) may be performed repeatedly.

When the reception CRC code and the recalculated comparison CRC code are the same (YES of S160), the CRC checker 212 may correct the error by reflecting the error position estimation data to the reception data (S170); that is, the CRC checker 212 may be configured to correct the error by incorporating the error position estimation data into the reception data. For example, the error may be corrected by subtracting the error position estimation data from the reception data. Accordingly, the CRC checker 212 may identify that the transmission data and the reception data are the same (S180).

In the description below, the configuration of the CRC decoder 210 will be described in detail with reference to FIG. 3.

Figure 3:
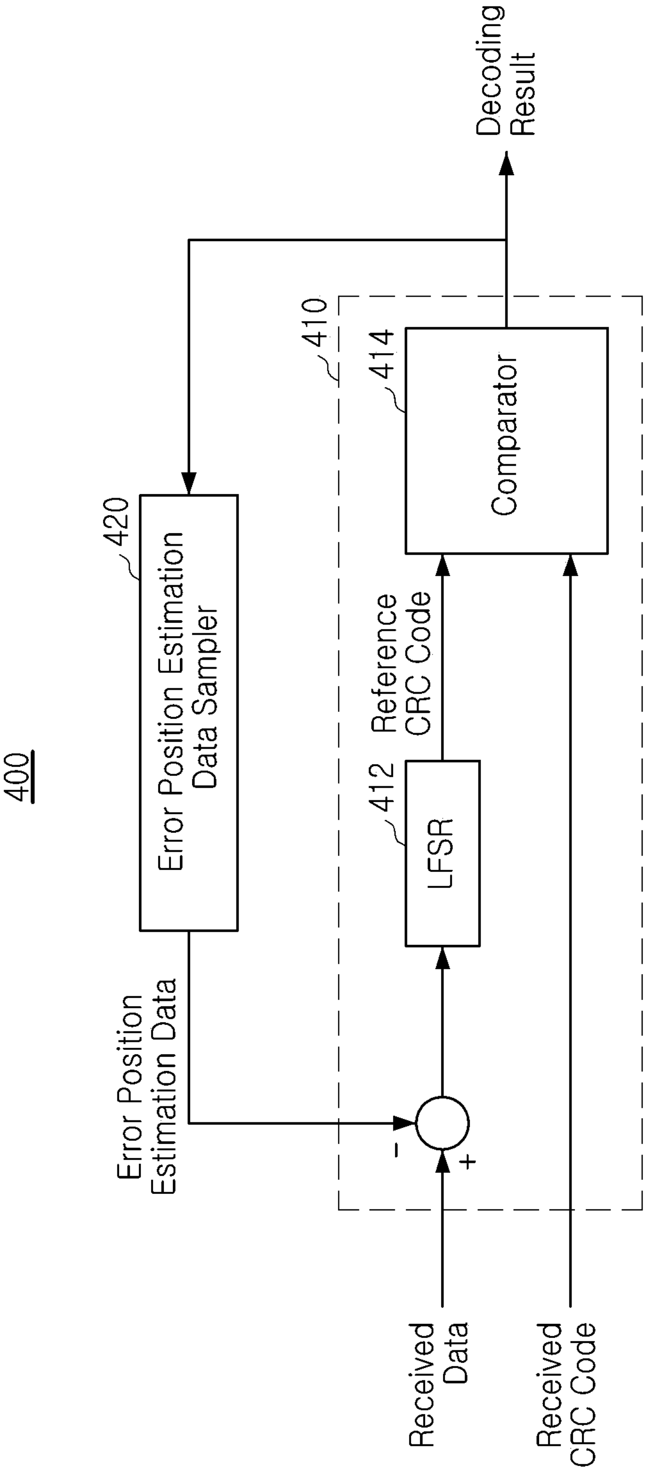
FIG. 3 is a schematic block diagram illustrating a CRC decoder according to an example embodiment of the present disclosure.

FIG. 3 is a diagram illustrating a CRC decoder 400 according to an example embodiment.

The CRC decoder 400 in an example embodiment may determine whether the reception data includes an error using the CRC code, and may correct the included error. Referring to FIG. 3, the CRC decoder 400 may include a CRC checker 410 and an error position estimation data sampler 420.

The CRC checker 410 may be configured to determine whether the reception data (i.e., received data) includes an error using the CRC codeword including the reception data and the reception CRC code (i.e., received CRC code). In an example embodiment, the CRC checker 410 may include a linear feedback shift register (LFSR) 412 and a comparator 414.

Specifically, the linear feedback shift register 412 may receive reception data. The linear feedback shift register 412 may generate a comparison CRC code (i.e., reference CRC code) from the reception data, and may transmit the comparison CRC code to the comparator 414. For example, the linear feedback shift register 412 may add a bit stream consisting of "0" to the end of the reception data and divide the data by the CRC polynomial shared from the first memory device 100 in FIG. 1, thereby obtaining a remainder. The linear feedback shift register 412 may determine the bit stream corresponding to a remainder as a comparison CRC code.

The input data provided to the comparator 414 may be the reception CRC code and the comparison CRC code. The comparator 414 may determine whether the reception CRC code and the comparison CRC code are the same. For example, the comparator 414 may compare the reception CRC code with the comparison CRC code in each bit position, and the comparison may be performed from the bit in the highest position.

The comparator 414 may generate and output a decoding result indicating whether the reception CRC code and the comparison CRC code are the same (i.e., match). When the reception CRC code and the comparison CRC code in each bit position are the same, the comparator 414 may output a first decoding result. The first decoding result may be a first logic level (e.g., "0"). In this case, the first decoding result may not activate the error position estimation data sampler 420.

When the reception CRC code and the comparison CRC code at at least one bit position are not the same, the comparator 414 may output a second decoding result. The second decoding result may be a second logic level (e.g., "1"). In this case, the second decoding result may activate the error position estimation data sampler 420.

The activated error position estimation data sampler 420 may sample error position estimation data. The error position estimation data sampler 420 may sample the error position estimation data based on a probability of error in each bit position of the reception data. For example, a length (i.e., number of bits or bit length) of the reception data may be the same as a length of the error position estimation data.

The error position estimation data sampler 420 may transmit the sampled error position estimation data to the CRC checker 410. The CRC checker 410 may combine the error position estimation data with the reception data (e.g., with a summation unit or other combiner module) and may transmit the data, including the error position estimation data, to the linear feedback shift register 412.

The linear feedback shift register 412 may recalculate a comparison CRC code based at least in part on the data in which the error position estimation data is reflected and the reception data and may transmit the recalculated comparison CRC code to the comparator 414. For example, the CRC checker 410 may recalculate a comparison CRC code from data obtained by subtracting the error position estimation data from the reception data. Specifically, the CRC checker 410 may flip a bit in the position at which the bit of the error position estimation data is "1" in the reception data, and may recalculate the comparison CRC code from the bit-flipped reception data.

The comparator 414 may output a decoding result by comparing the reception CRC code with the recalculated comparison CRC code in each bit position.

When the comparator 414 outputs the first decoding result, the CRC decoder 400 may correct an error in the reception data by reflecting the error position estimation data in the reception data.

When the comparator 414 outputs the second decoding result, the error position estimation data sampler 420 may remain activated. In other words, the error position estimation data sampler 420 may sample new error position estimation data and may transmit the data to the CRC checker 410. For example, a probability of error in the error position estimation data may be higher than a probability of an error in the new error position estimation data.

The CRC checker 410 may reflect the new error position estimation data in the reception data and may transmit the data to the linear feedback shift register 412. The linear feedback shift register 412 may recalculate a comparison CRC code from the data in which the error position estimation data is reflected in the reception data and may transmit the data to the comparator 414.

The comparator 414 may output a decoding result by comparing the reception CRC code with the recalculated comparison CRC code in each bit position. When the comparator 414 outputs the first decoding result, the CRC decoder 400 may correct an error in the reception data by reflecting the new error position estimation data to the reception data.

When the comparator 414 outputs the second decoding result, the processes of sampling the new error position estimation data, recalculating the comparison CRC code, and comparing the code with the reception CRC code may be performed repeatedly. That is, the error position estimation data may be selected in the order of high probability of error.

The processes may be repeated until the comparator 414 outputs the first decoding result. As another example, the maximum number of times the linear feedback shift register 412 samples the error position estimation data may be limited.

In the description below, the error position estimation data is described in detail with reference to FIG. 4, and the configuration of the error position estimation data sampler 420 will be described in detail with reference to FIGS. 5 and 6.

FIG. 4 is a diagram conceptually illustrating pieces of error position estimation data according to an example embodiment.

The error position estimation data EPED may have a bit corresponding to a position at which an error is estimated to occur in the reception data among a plurality of bits as "1." Also, a length of the error position estimation data EPED may be the same as a length of the reception data.

The error position estimation data sampler may store a plurality of pieces of error position estimation data EPED1-EPEDN and a corresponding probability of error in each bit position in advance. Referring to FIG. 4, a probability of error in the first error position estimation data EPED1 may be the highest, and a probability of error in the Nth error position estimation data EPEDN may be the lowest, where N is a natural number.

The error position estimation data sampler may select one of the plurality of pieces of error position estimation data EPED1-EPEDN as the error position estimation data and output the data. An error position estimation data sampler in an example embodiment may sample error position estimation data EPED based on a probability of error in each bit position of reception data.

For example, the error position estimation data EPED may be sequentially selected in the order of high probability of error. That is, the first error position estimation data EPED1 may be selected first, and up to Nth error position estimation data EPEDN may be sequentially selected. In other words, a probability of error in error position estimation data may be higher than a probability of error in new error position estimation data selected subsequently.

Figure 5:
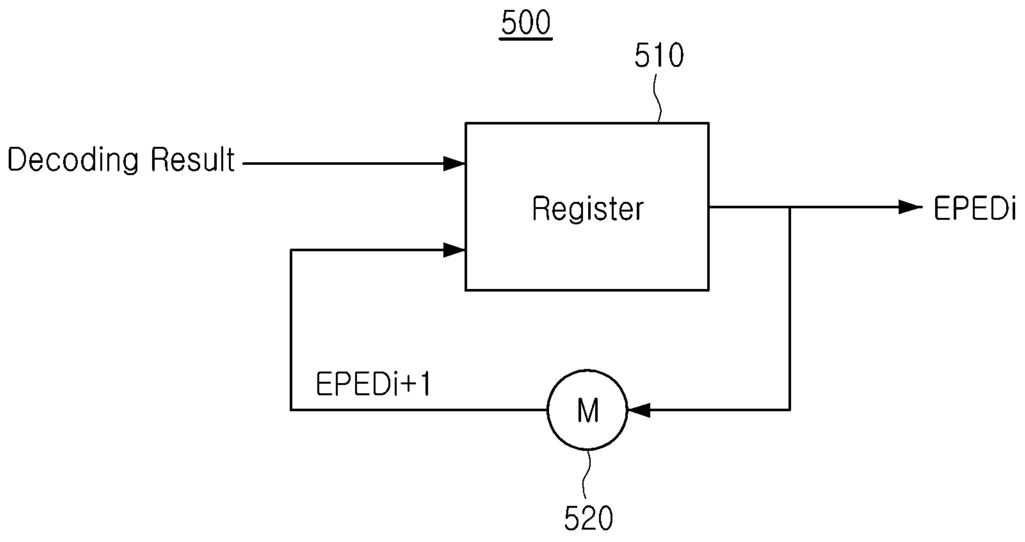
FIGS. 5 and 6 are schematic block diagrams illustrating an error position estimation data sampler according to example embodiments of the present disclosure.
Figure 6:
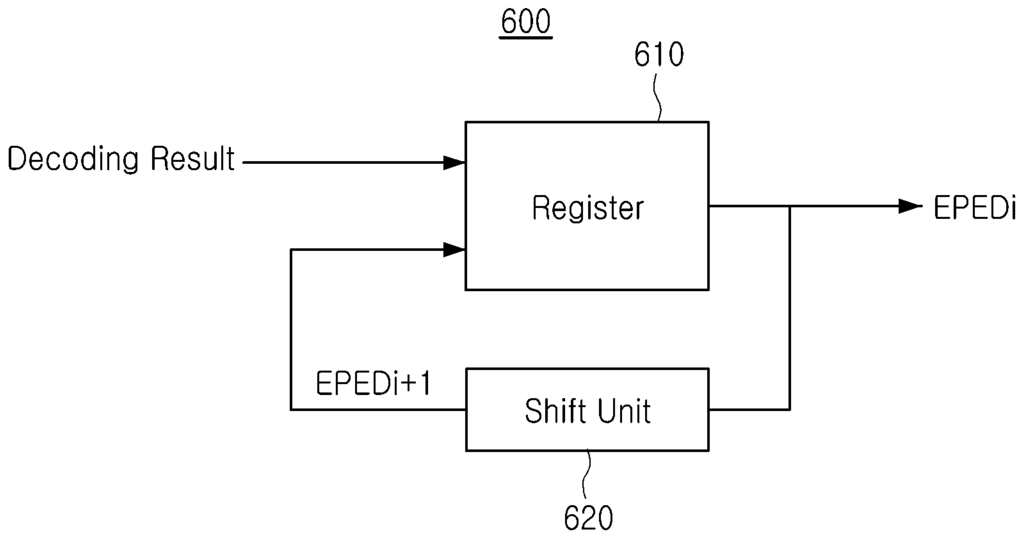

FIGS. 5 and 6 are schematic block diagrams illustrating implementations of an error position estimation data sampler (e.g., 420 in FIG. 3) according to example embodiments.

When the reception CRC code and the comparison CRC code are not the same, the error position estimation data samplers 500 and 600 may sample error position estimation data EPED and may transmit the data to the CRC checker.

Referring to FIGS. 5 and 6, when the first decoding result is provided as an input to the error position estimation data sampler (see, e.g., 420 in FIG. 3), the error position estimation data samplers 500 and 600 may not sample error position estimation data EPED. When the second decoding result is input, the error position estimation data samplers 500 and 600 may sample error position estimation data EPED and may transmit the data to the CRC checker.

Referring to FIGS. 5 and 6, the error position estimation data samplers 500 and 600 may sample new error position estimation data using feedback control. Specifically, even when the ith error position estimation data EPEDi (where i is a natural number) is reflected in the reception data, but the second decoding result is input (i.e., when the recalculated CRC comparison code does not match the reception CRC code), the ith+1 error position estimation data EPEDi+1 may be sampled as new error position estimation data and may be output.

In this case, the error position estimation data samplers 500 and 600 may include the registers 510 and 610, respectively. The registers 510 and 610 in an example embodiment may temporarily store the ith+1 error position estimation data EPEDi+1 and may transmit the ith+1 error position estimation data EPEDi+1 according to the decoding result.

The first error position estimation data EPED1 sampled first may be preset in the error position estimation data samplers 500 and 600. For example, the first error position estimation data may be data in which the least significant bit among a plurality of bits is "1." However, an example embodiment thereof is not limited thereto.

First, referring to FIG. 5, the error position estimation data sampler 500 may include a register 510 and a multiplier 520 connected in a feedback configuration with the register 510. The multiplier 520 may generate the ith+1 error position estimation data EPEDi+1 by multiplying the ith error position estimation data EPEDi by M. The value of M may be a power of 2.

For example, M may be "2." When the first error position estimation data is "00000001," the multiplier 520 may output "00000010" as the second error position estimation data. Thereafter, the multiplier 520 may output "00000100" as the third error position estimation data.

As another example, M may be "4." When first error position estimation data is "00000001," the multiplier 520 may output "00000100" as the second error position estimation data. Thereafter, the multiplier 520 may output "00010000" as the third error position estimation data.

However, the value of M and/or the length of the error position estimation data EPED may not be limited thereto.

Referring to FIG. 6, the error position estimation data sampler 600 may include a register 610 and a shift unit 620 connected in a feedback configuration with the register 610. The shift unit 620 may generate the ith+1 error position estimation data EPEDi+1 by shift-computing a plurality of bits of the ith error position estimation data EPEDi.

For example, the shift unit 620 may perform logical shift-computation. The shift unit 620 may generate the ith+1 error position estimation data EPEDi+1 by inserting "0" as many as the number of at least one shift-computed bit at the end of the ith error position estimation data EPEDi.

Specifically, the shift unit 620 may generate the ith+1 error position estimation data EPEDi+1 by performing a logical left shift or logical right shift-computation on the i+1 error position estimation data EPEDi+1. For example, the shift unit 620 may output "00100000" or "00010010" as the ith+1 error position estimation data EPEDi+1 by shifting the ith error position estimation data EPEDi "01001000" by two bits to the left or right.

However, the number of shifted bits and/or the length (i.e., number of bits or bit length) of the error position estimation data EPED may not be limited thereto.

As another example, the shift unit 620 may perform a circular shift-computation. The shift unit 620 may generate the ith+1 error position estimation data EPEDi+1 by inserting at least one bit output from one end of the ith error position estimation data EPEDi to the other end due to the shift-computation.

Specifically, the shift unit 620 may generate the ith+1 error position estimation data EPEDi+1 by performing a logical left shift or logical right shift-computation on the i+1 error position estimation data EPEDi+1. For example, the shift unit 620 may output "00100001" or "00010010" as the ith+1 error position estimation data EPEDi+1 by shifting "01001000," which is the ith error position estimation data EPEDi, to the left or right by two bits.

However, the number of bits shifted and/or the length of error position estimation data EPED may not be limited thereto.

Figure 7:
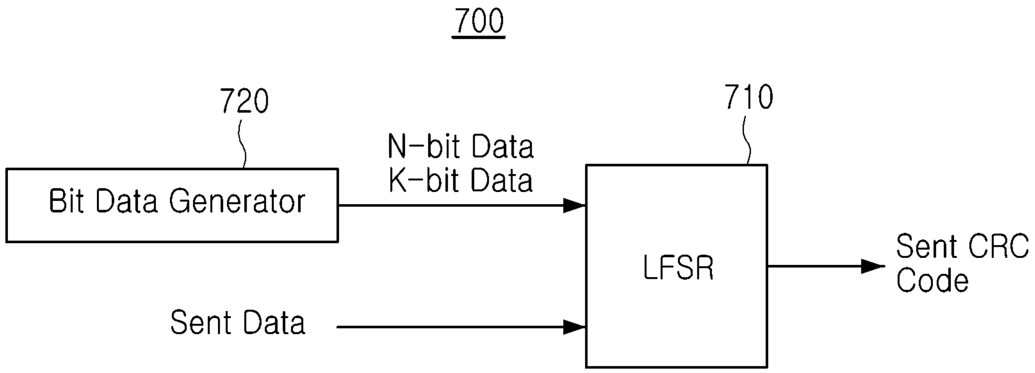
FIG. 7 is a schematic block diagram illustrating a CRC encoder according to an example embodiment of the present disclosure.

FIG. 7 is a schematic block diagram illustrating an implementation of a CRC encoder (e.g., 110 in FIG. 1) according to an example embodiment.

The CRC encoder 700 in an example embodiment may include a linear feedback shift register 710 and a bit data generator 720. The linear feedback shift register 710 may generate a transmission CRC code from transmission data (i.e., sent data). The CRC encoder 700 may generate and transmit a CRC codeword in which the transmission data and the transmission CRC code are combined.

The CRC encoder 700 in an example embodiment may change a length (i.e., number of bits or bit length) of the transmission CRC code. Specifically, the length of the transmission CRC code may be changed by controlling the linear feedback shift register 710 by N-bit data and K-bit data generated by the bit data generator 720.

The N-bit data may correspond to data controlling a degree K of the CRC polynomial. The length of the transmission CRC code may be K bits, which is the same as a degree of the CRC polynomial. Accordingly, the length of the transmission CRC code may be controlled to K bits using N-bit data. In this case, N and K may be the same number or different natural numbers.

The K-bit data may be data according to values of coefficients of the CRC polynomial. Each term of the CRC polynomial may have a coefficient of "1" or "0." Accordingly, the coefficient of each term of the CRC. polynomial of degree K may be controlled using K-bit data.

For example, when the highest degree of the CRC polynomial is 16, the N-bit data may be 16-bit data. When the degree of the CRC polynomial is changed from 16 to 8, the K-bit data may be 8-bit data. In other words, the length of the CRC code may be controlled from 16 bits to 8 bits using 16-bit data, and the coefficient of each term of the 8th CRC polynomial may be controlled using 8-bit data.

Figure 8:
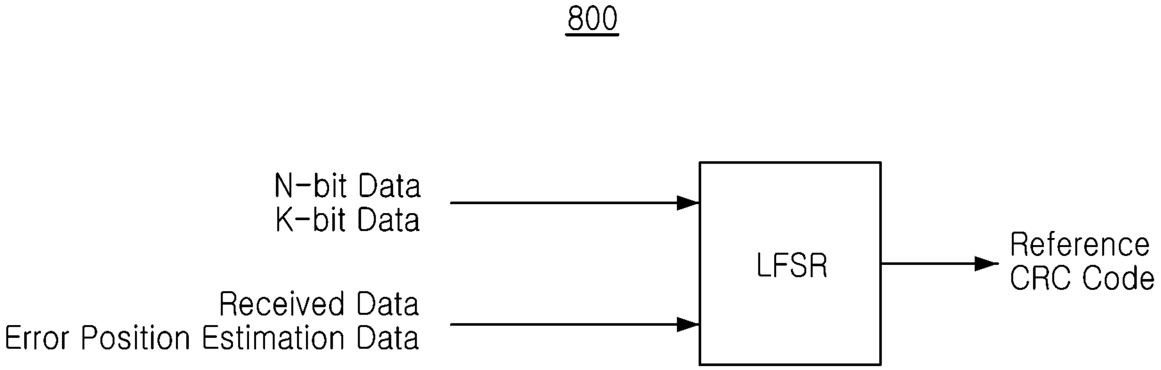
FIG. 8 is a schematic block diagram illustrating a linear feedback shift register included in a CRC decoder according to an example embodiment of the present disclosure.

FIG. 8 is a schematic block diagram illustrating a linear feedback shift register included in a CRC decoder (e.g., 210 in FIG. 1) according to an example embodiment.

The CRC decoder in an example embodiment may include a linear feedback shift register 800. The linear feedback shift register 800 may generate a comparison CRC code (i.e., reference CRC code) from reception data (i.e., received data). In some cases, the linear feedback shift register 800 may recalculate the comparison CRC code by incorporating (i.e., reflecting) error position estimation data in the reception data. For example, the linear feedback shift register 800 may flip a bit of a position at which a bit of error position estimation data is "1" in the reception data, and may recalculate the comparison CRC code from the flipped reception data.

The CRC decoder in an example embodiment may change the length of the comparison CRC code. Referring to FIG. 7 together, N-bit data and K-bit data generated by the bit data generator 720 in FIG. 7 may be shared with the CRC decoder. For example, N-bit data and K-bit data may be shared through the channel 300 in FIG. 1. By controlling the linear feedback shift register 800 by N-bit data and K-bit data, the length of comparison CRC code may be changed.

N-bit data may be configured to control the degree K of the CRC polynomial. The length of the comparison CRC code may be K bits, which is the same as the degree of CRC polynomial. Accordingly, the length of comparison CRC code may be controlled to K bits using N-bit data. In this case, N and K may be the same number or different natural numbers.

K-bit data may depend on values of coefficient of the CRC polynomial, and the CRC polynomial may be shared from the CRC encoder 700 in FIG. 7. Each term of the CRC polynomial may have a coefficient of "1" or "0." Accordingly, the coefficient of each term of the CRC. polynomial of degree K may be controlled using K-bit data.

Referring to FIG. 7 together, the linear feedback shift register 710 of the CRC encoder 700 and the linear feedback shift register 800 of the CRC decoder may be controlled the same by N-bit data and K-bit data. In other words, the length of the comparison CRC code may be controlled to be the same as the length of the transmission CRC code.

Accordingly, even when the length of the CRC code is changed, the CRC decoder may perform the function of determining whether an error is included in the reception data and correcting the error using the CRC code having the changed length.

In the description below, the configuration of the linear feedback shift register included in the CRC encoder and the CRC decoder will be described in detail with reference to FIG. 9.

Figure 9:
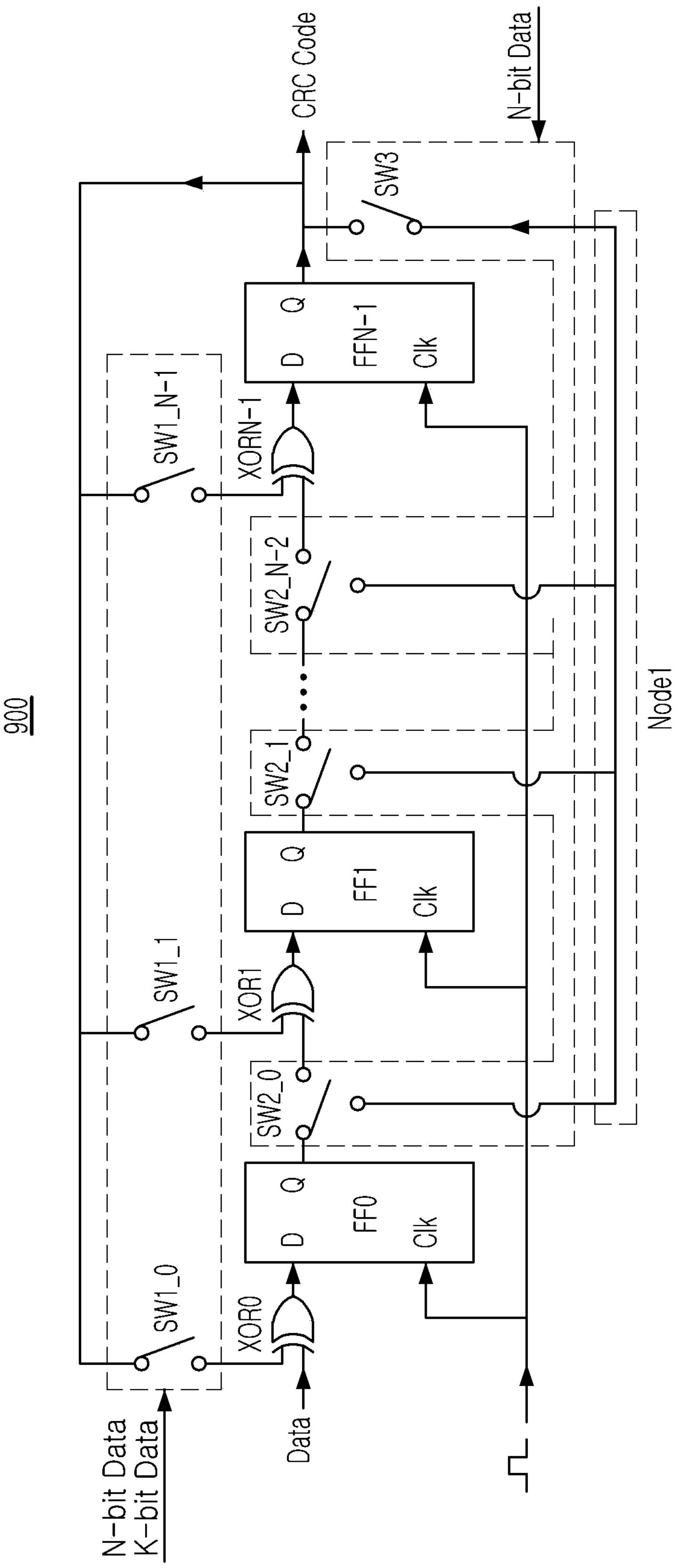
FIG. 9 is a schematic circuit diagram illustrating a linear feedback shift register according to an example embodiment of the present disclosure.

FIG. 9 is a schematic circuit diagram illustrating a linear feedback shift register 900 according to an example embodiment.

The CRC encoder and the CRC decoder may include a linear feedback shift register 900. In one or more embodiments, the linear feedback shift register 900 included in each of the CRC encoder and the CRC decoder may have the same structure.

Referring to FIG. 9, the linear feedback shift register 900 may include a data input terminal and a CRC code output terminal. The linear feedback shift register 900 may receive data through the data input terminal, may derive a CRC code from the received data, and may output the CRC code through the CRC code output terminal.

Referring to FIG. 7 and FIG. 9 together, the linear feedback shift register 900 included in the CRC encoder may receive transmission data through the data input terminal, may derive a transmission CRC code from the received transmission data, and may output the transmission CRC code through the CRC code output terminal.

Referring to FIG. 8 and FIG. 9 together, the linear feedback shift register 900 included in the CRC decoder may receive reception data through the data input terminal, may derive a comparison CRC code from the received reception data, and may output the comparison CRC code through the CRC code output terminal.

Referring to FIG. 9, the linear feedback shift register 900 may include an N number of XOR gates XOR0-XORN−1, an N number of flip-flops FF0-FFN−1, an N number of first switches SW1_0-SW1_N−1, an (N−1) number of second switches SW2_0-SW_N−2, and a third switch SW3 between the data input terminal and the CRC code output terminal.

The N number of XOR gates XOR0-XORN−1, the N number of flip-flops FF0-FFN−1, and the (N−1) number of second switches SW2_0-SW_N−2 may be connected to each other alternately. For example, the 0th XOR gate XOR0, the 0th flip-flop FF0, and the 0th second switch SW2_0 may be connected to each other in series in the order as mentioned. Thereafter, the first XOR gate XOR1, the first flip-flop FF1, and the first second switch SW2_1 may be connected to each other in series in the order as mentioned, with an input of the first XOR gate XOR1 connected to the 0th second switch SW2_0.

In an example embodiment, the N number of flip-flops FF0-FFN−1 may be D flip-flops. The D flip-flop may include a D input terminal to which data is provided, a Clk input terminal to which a clock signal is provided, and a Q output terminal to which stored (i.e., latched) data is output.

Each of the N number of first switches SW1_0-SW1_N−1 may correspond to a single pole single throw (SPST) switch and may include a single input terminal and a single output terminal. The input terminal of each of the N number of first switches SW1_0-SW1_N−1 may be connected to the CRC code output terminal, and the output terminals of the N number of first switches SW1_0-SW1_N−1 may be connected to input terminals of corresponding XOR gates among the N number of XOR gates XOR0-XORN−1. For example, the 0th first switch SW1_0 may correspond to the 0th XOR gate XOR0.

Each of the (N−1) number of second switches SW2_0-SW_N−2 may correspond to a single pole double throw (SPDT) switch and may include a single input terminal and two output terminals. The input terminal of each of the second switches SW2_0-SW_N−2 may be connected to the Q output terminal of a corresponding flip-flop of an adjacent preceding stage among the first N−1 number of flip-flops FF0-FFN−2. The first output terminal of each of the (N−1) number of second switches SW2_0-SW_N−2 may be connected to the input terminal of a corresponding XOR gate of an adjacent subsequent stage among the N−1 number of XOR gates XOR1-XORN−1. The second output terminal of each of the (N−1) number of second switches SW2_0-SW_N−2 may be connected to a first node Node1.

The third switch SW3 may correspond to a single pole single throw (SPST) switch and may include a single input terminal and a single output terminal. The input terminal of the third switch SW3 may be connected to the first node Node1, and the output terminal of the third switch SW3 may be connected to the CRC code output terminal, which is also the Q output terminal of the last flip-flop FFN−1 among the N flip-flops FF0-FFN−1.

The data input terminal of the linear feedback shift register 900 may be connected to the input terminal of the 0th (i.e., first) XOR gate XOR0. The CRC code output terminal of the linear feedback shift register 900 may be connected to the Q output terminal of the Nth flip-flop FFN−1 and the output terminal of the third switch SW3.

Operation of the linear feedback shift register 900 may be controlled by a clock signal. When an initial clock signal is input, the Nth flip-flops FF0-FFN−1 may be determined to be in an initial state. Thereafter, whenever the clock signal is input, a plurality of bits included in the data may be sequentially (i.e., serially) input one by one to the data input terminal. The N flip-flops FF0-FFN−1 may move the input data to the subsequent flip-flop. Also, the bit of the CRC code may be output one by one to the CRC code output terminal. In this case, the XOR gate at a specific position may derive a new bit value by performing an XOR computation, and the new bit value may be input to the subsequent flip-flop.

In an example embodiment, the linear feedback shift register 900 may control the state of the N number of first switches SW1_0-SW1_N−1, the (N−1) number of second switches SW2_0-SW_N−2 and the third switch SW3 based on N-bit data. The length of N-bit data may be N bits, which is the same as the maximum degree N which the CRC polynomial may have.

From the bit of the lowest digit of the N-bit data, each bit may control the state of the corresponding first switch SW1 among the N number of first switches SW1_0-SW1_N−1 in sequence. For example, the lowest digit bit (i.e., least significant bit) of N bits may control the state of the first switch SW1_0, and the highest digit bit (i.e., most significant bit) of N bits may control the state of the first switch SW1_N−1.

From the lowest digit bit of N-bit data, the state of the corresponding second switch SW2 among the (N−1) number of the second switches SW2_0-SW_N−2 may be controlled in sequence. For example, the lowest digit bit of N bits may control the state of the second switch SW2_0, and the second highest digit bit of N bits may control the state of the second switch SW2_N−2.

When a bit of N-bit data is "1," the corresponding first switch SW1 among the N number of first switches SW1_0-SW1_N−1 may be controlled to a turned-on (i.e., enabled or active) state, and the corresponding second switch SW2 among the (N−1) number of second switches SW2_0-SW_N−2 may be controlled to be in a first turned-on state (i.e., first position of the switch). The first turned-on state of the second switch SW2 may be a state in which the input terminal of the second switch (SW2) is electrically connected to the input terminal of the adjacent XOR gate among the N number of XOR gates XOR0-XORN−1 via the first output terminal of the second switch SW2.

When a bit of N-bit data is "0," the corresponding first switch SW1 among the N number of first switches SW1_0-SW1_N−1 may be controlled to a turned off-state, and the corresponding second switch SW2 among the (N−1) number of second switches SW2_0-SW_N−2 may be controlled to be in a second turned-on state (i.e., second position of the switch). The second turned-on state of the second switch SW2 may be a state in which the input terminal of the second switch SW2 is electrically connected to the first node Node1 via the second output terminal of the second switch SW2. Also, when at least one bit of the N-bit data is "0," the third switch SW3 may be controlled to the turned-on state.

The length of the CRC code may be K bits, which is the same as the degree of the CRC polynomial. The length of the CRC code may be controlled to K bits using the N-bit data. Specifically, K bits of the N-bit data may be "1," and an (N−K) number of bits of the N-bit data may be "0." In other words, the length of the CRC code may be controlled by the number of bits, which are "1," among the pieces of N-bit data. In this case, N and K may be the same number or different natural numbers.

In an example embodiment, the linear feedback shift register 900 may control, based on K-bit data, a state of at least one first switch SW1 among the N number of first switches SW1_0-SW1_N−1, which are in a turned-on state, by the N-bit data. From the lowest digit bit of the K-bit data, each bit may control the state of a corresponding first switch SW1 among the K number of first switches, which are in turned-on state, in sequence.

The K number of first switches SW1_0-SW1_K may be in a turned-on state by N-bit data. The lowest digit bit of K bits may control the state of the first switch SW1_0, and the highest digit bit of K bits may control the state of the first switch SW1_K−1.

The degree K of the CRC polynomial may be the same as the length of the CRC code. The K-bit data may depend on the values of the coefficient of the CRC polynomial. The lowest digit bit of the K-bit data may correspond to the coefficient of the lower degree of the CRC polynomial in sequence. The highest digit bit of the K-bit data may correspond to the coefficient of the second highest degree of the CRC polynomial.

When a bit of K-bit data is "1," the coefficient of the corresponding degree of CRC polynomial may be "1," and the corresponding first switch SW1 among the first switches in the turned-on state may be controlled to maintain the turned-on state. When a bit of K-bit data is "0," the coefficient of the corresponding degree of CRC polynomial corresponds to "0," and the corresponding first switch SW1 among the first switches in the turned-on state may be controlled to change to the turned off-state.

In the description below, specific example embodiments of N-bit data and K-bit data will be described in detail with reference to FIG. 10.

FIG. 10 is a diagram conceptually illustrating N-bit data and K-bit data according to example embodiments.

The length of the N-bit data may be N bits, which is the same as the maximum degree N which the CRC polynomial may have. The length of the CRC code may be K bits, which is the same as the degree of the CRC polynomial. The length of the K-bit data may be the same as or shorter than the length of the N-bit data.

As an example embodiment illustrated in FIG. 10, the length of the N-bit data may be 16 bits, and the maximum length of the CRC code may be 16 bits. The K bits, the length of the CRC code, may be 16 bits or shorter than 16 bits. However, the length of the N-bit data and/or the K-bit data may not be limited thereto.

Referring to FIG. 9 and FIG. 10 together, the linear feedback shift register 900 may include 16 XOR gates XOR0-XOR15, 16 flip-flops FF0-FF15, 16 first switches SW1_0-SW1_15, 15 second switches SW2_0-SW_14 and a third switch SW3 between the data input terminal and the CRC code output terminal.

In the description below, the example in which the length of the CRC code is 16 bits will be described.

The length of the N-bit data may be 16 bits, and the N-bit data may be "1111111111111111." Referring to FIG. 9 together, since the entirety of bits of N-bit data are "1," the first switches SW1_0-SW1_15 may be controlled to a turned-on state, and the second switches SW2_0-SW_14 may be controlled to a first turned-on state. Also, the third switch SW3 may be controlled to a turned off-state.

According to an example embodiment illustrated in FIG. 10, since the highest degree of the CRC polynomial is 16, the length of the K-bit data may be 16 bits, and the K-bit data may be "1000000000000101." From the bit of the lowest digit of the K-bit data, each bit may control the state of the corresponding first switch SW1 among the first switches SW1_0-SW1_15, which are in a turned-on state, in sequence. Referring to FIG. 9 together, the three first switches SW1_0, SW1_2, and SW1_15 may be controlled to maintain the turned-on state, and the remainder of first switches may be controlled to change to the turned off-state.

In the description below, the example in which the length of the CRC code is 8 bits will be examined.

The length of the N-bit data may be 16 bits, and the N-bit data may be "0000000011111111." Referring to FIG. 9 and FIG. 10 together, since the low-order 8 bits of the N-bit data are "1," a portion of the first switches SW1_0-SW1_7 may be controlled to the turned-on state, and a remaining portion of the first switches SW1_8-SW1_15 may be controlled to the turned off-state. A portion of the second switches SW2_0-SW_7 may be controlled to the first turned-on state, and the remainder of the second switches SW2_8-SW2_14, may be controlled to a turned off-state. Also, since at least one bit of the N-bit data is "0," the third switch SW3 may be controlled to a turned-on state.

According to an example embodiment illustrated in FIG. 10, since the highest degree of the CRC polynomial is 8, the length of the K-bit data may be 8 bits, and the K-bit data may be "00000111." From the bit of the lowest digit of the K-bit data, each bit may control the state of the corresponding first switch SW1 among a portion of first switches SW1_0-SW1_7, which are in a turned-on state, in sequence. Referring to FIG. 9 and FIG. 10 together, a portion of the first switches SW1_0-SW1_2 may be controlled to maintain the turned-on state, and the remainder of the first switches SW1_3-SW1_7, may be controlled to change to the turned off-state.

In the description below, the example in which the length of the CRC code is 4 bits will be described.

The length of N-bit data may be 16 bits, and the N-bit data may be "0000000000001111." Referring to FIG. 9, since the four low-order bits of the N-bit data are "1," a portion of the first switches SW1_0-SW1_3 may be controlled to a turned-on state, and the remainder of the first switches SW1_4-SW1_15, may be controlled to a turned off-state. A portion of the second switches SW2_0-SW_3 may be controlled to a first turned-on state, and the remainder of the second switches SW2_4-SW2_14, may be controlled to a turned off-state. Also, since at least one bit of the N-bit data is "0," the third switch SW3 may be controlled to the turned-on state.

According to an example embodiment illustrated in FIG. 10, since the highest degree of the CRC polynomial is 4, the length of the K-bit data may be 4 bits, and the K-bit data may be "1111." From the lowest digit bit of the K-bit data, each bit may control the state of the corresponding first switch SW1 among the first switches SW1_0-SW1_3, which are in the turned-on state, in sequence. Referring to FIG. 9 and FIG. 10 together, the first switches SW1_0-SW1_3 may be controlled to maintain the turned-on state.

The linear feedback shift register may change the length of the CRC code using the N-bit data and the K-bit data. In this case, the length of the CRC code may be changed within N bits, which is the maximum length of the CRC code. However, even when the length of the CRC code is changed, the size of the data block determined for transmitting and receiving the CRC code may be maintained as N bits.

As an example embodiment, when the length of the K-bit data is shorter than the length of the N-bit data, the CRC encoder may use (N−K) bits as metadata. As an example embodiment illustrated in FIG. 10, the size of the data block may be 16 bits. When the transmission CRC code is 8 bits, 8 bits may be used as metadata. When the transmission CRC code is 4 bits, 12 bits may be used as metadata.

That is, a section of which a length of the CRC code is reduced may be used as metadata. In other words, in the size of the data block determined for transmitting and receiving the CRC code, the remainder of bits in the data block not used for the CRC code may be used as metadata. Accordingly, the degree of freedom in utilizing the data block determined for transmitting and receiving the CRC code may be improved.

Figure 11:
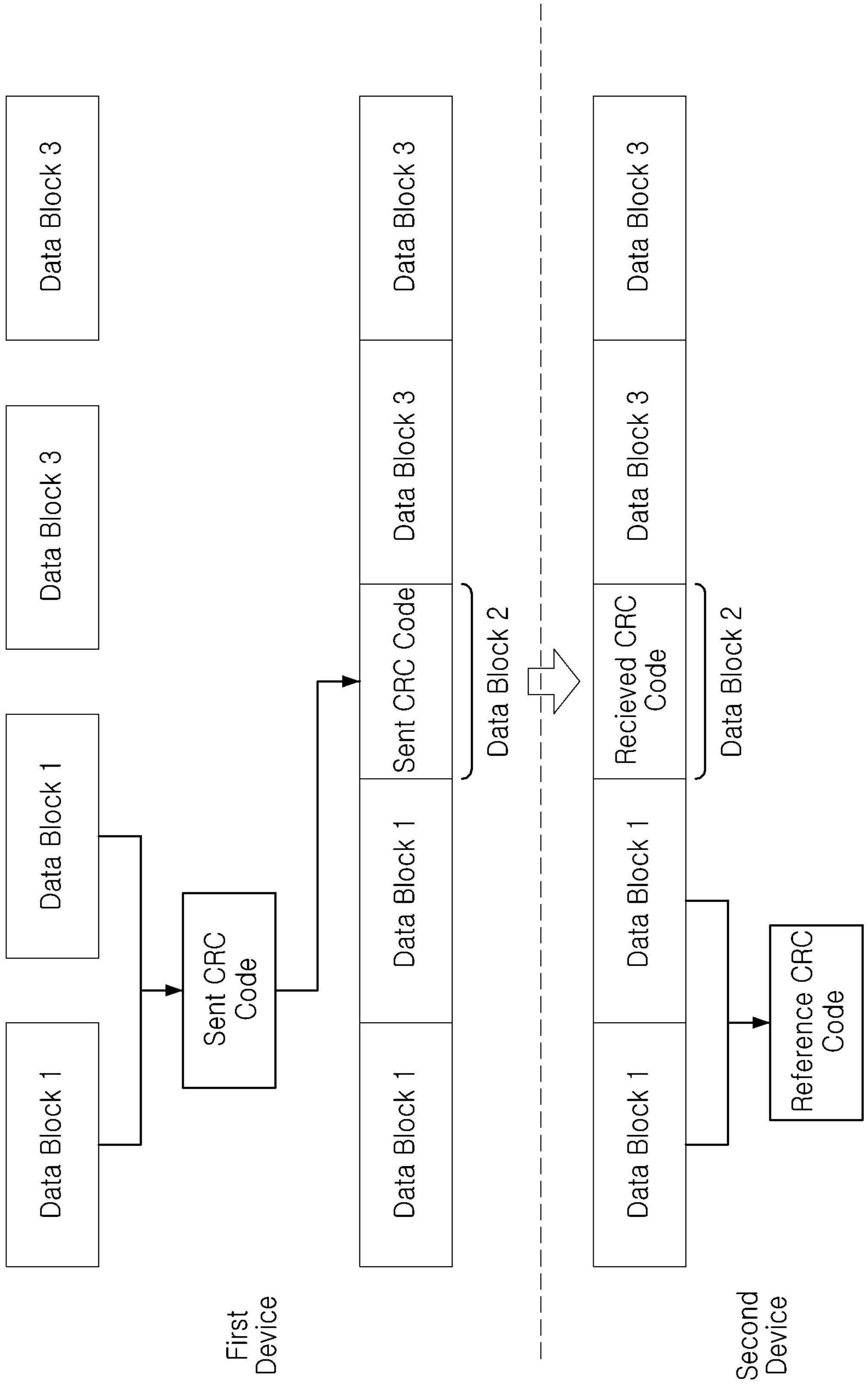
FIGS. 11 and 12 are diagrams conceptually illustrating a plurality of data blocks according to example embodiments of the present disclosure.
Figure 12:
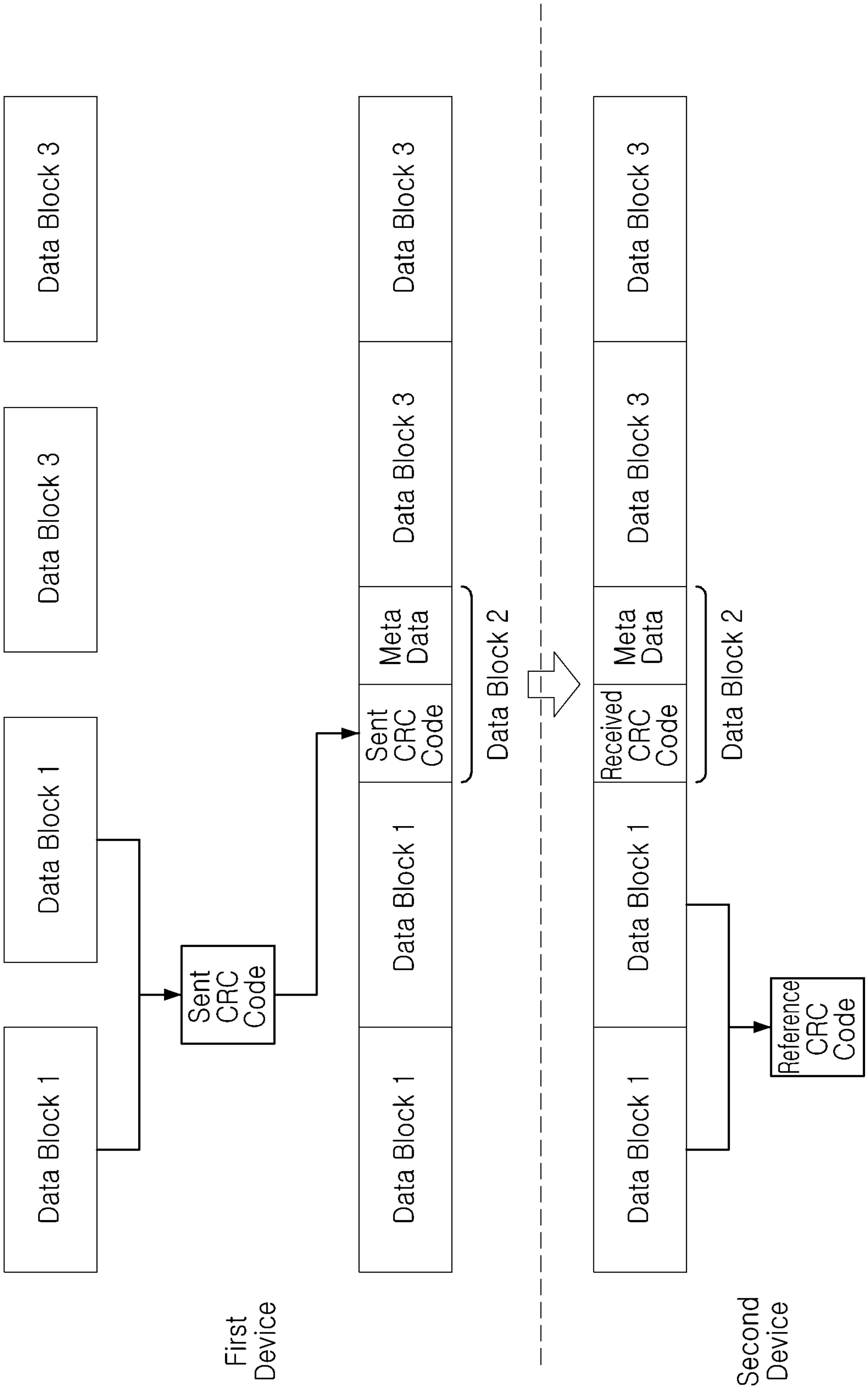

FIGS. 11 and 12 are diagrams illustrating a plurality of data blocks according to example embodiments.

Referring to FIG. 11 and FIG. 12, the electronic memory device may include a first memory device and a second memory device, and specific example embodiments thereof may be similar to the examples described with reference to FIG. 1 to FIG. 10.

The first memory device and the second memory device may exchange data using packet-based communication, although embodiments are not limited thereto. A packet may be a logical unit in which data is transmitted. In one or more embodiments, a packet may include a header, a payload, and a trailer. A header may include a destination, a source, a sequence number, or control information of a packet. A payload may include actual data to be transmitted (e.g., message data). A trailer may include information for error detection and correction, and may include a CRC code, for example.

A packet may include a plurality of data blocks, and data of a packet may be divided into data block units and may be transmitted. In other words, a packet may include a plurality of data blocks. A data block may include at least one flit. The term "flit," in the context of computer networking, may refer to a flow control unit or flow control digit, which is a link-level atomic piece that forms a network packet or stream. The plurality of data blocks may include at least one first data block, a second data block, and at least one third data block.

In an example embodiment, a header of a packet may be configured as at least one first data block, a trailer of the packet may be configured as a second data block, and a payload of the packet may be configured as at least one third data block.

In another example embodiment, a header of a packet may be configured as at least one first data block, a trailer of the packet may be configured as a second data block, a portion of a payload of the packet may be configured as one first data block, and a remainder portion of the payload may be configured as at least one third data block.

The first memory device may include a data block generation portion, a CRC encoder, and a transmission portion. The data block generation portion may generate a plurality of data blocks by dividing the packet or stream into data block units. In an example embodiment illustrated in FIGS. 11 and 12, the data block generation portion may generate two first data blocks, a second data block, and two third data blocks.

In an example embodiment, the two first data blocks may correspond to the header of the packet, and the two third data blocks may correspond to the payload of the packet. In another example embodiment, the two first data blocks may correspond to a portion of the header and payload of the packet, and the two third data blocks may correspond to the remainder portion of the payload.

The second data block may include a transmission (i.e., sent) CRC code derived from the two first data blocks. In other words, the CRC encoder may derive the transmission CRC code from data included in the first data block. The transmission CRC code may not be derived from data included in the two third data blocks.

The transmission portion may transmit the two first data blocks, the second data block, and the two third data blocks to the second memory device in sequence.

The second memory device may include a reception portion, a data block reassembly portion, and a CRC decoder. The reception portion may receive a plurality of data blocks from the first memory device. The data block reassembly portion may classify the received plurality of data blocks into at least one first data block, a second data block, and at least one third data block. In an example embodiment illustrated in FIGS. 11 and 12, the data block generation portion in the first memory device may generate two first data blocks, a second data block, and two third data blocks. In this case, the second data block may include a reception CRC code for the two first data blocks.

The CRC decoder in the second memory device may generate a comparison (i.e., reference) CRC code from data included in at least one first data block. In an example embodiment illustrated in FIGS. 11 and 12, the CRC decoder may generate a comparison CRC code from data included in the two first data blocks. The CRC decoder may determine whether the data included in the two first data blocks received includes an error by comparing the reception (i.e., received) CRC code with the comparison CRC code. When the reception CRC code and the comparison CRC code are not the same, the CRC decoder may determine that the data included in the two first data blocks includes an error.

The CRC decoder may sample an error position estimation data block, and may recalculate the comparison CRC code to incorporate the error position estimation data block corresponding to the first data block. For example, the CRC decoder may flip a bit of a position at which the bit of the data included in the error position estimation data block is "1" in the data included in the first data block, and may recalculate the comparison CRC code from the flipped reception data.

When the reception CRC code and the recalculated comparison CRC code are the same, the CRC decoder may use information from the error position estimation data block resulting in a match between the reception CRC code and the recalculated comparison CRC code to correct the error in the first data block.

Referring to FIG. 11 and FIG. 12, the length of the second data block may be fixed. The length of the transmission CRC code, the length of the reception CRC code, and the length of the comparison CRC code may be the same. However, when comparing FIG. 11 with FIG. 12, there may be a difference in the lengths of the transmission CRC code and the reception CRC code included in the second data block. Specific example embodiments for the length of the transmission CRC code and the length of the reception CRC code may be similar to the examples described with reference to FIG. 7 to FIG. 10.

First, referring to FIG. 11, the length of the transmission CRC code and the reception CRC code included in the second data block may be the same as the length of the second data block. For example, the length of the second data block may be 16 bits, and the length of the transmission CRC code and the length of the reception CRC code may also be 16 bits, which are the same as the length of the second data block.

The CRC decoder may perform an operation of calculating a comparison CRC code immediately after receiving the two first data blocks and the second data block. In other words, since the operation of calculating the comparison CRC code is performed before the second memory device receives the two third data blocks, the time required to determine whether the two first data blocks contain an error may be shortened.

Referring to FIG. 12, the lengths of the transmission CRC code and the reception CRC code included in the second data block may be shorter than the length of the second data block. The second data block may further include metadata in the remainder section not used for the reception CRC code. For example, the length of the second data block may be 16 bits, the length of the transmission CRC code and the length of the reception CRC code may be 8 bits shorter than the length of the second data block. Accordingly, the second data block may further include 8 bits of metadata in the remainder section.

As compared to FIG. 11, as the first memory device and the second memory device in FIG. 12 includes metadata in the remainder section of the second data block, the degree of freedom in utilizing the second data block may be further improved.

Figure 13:
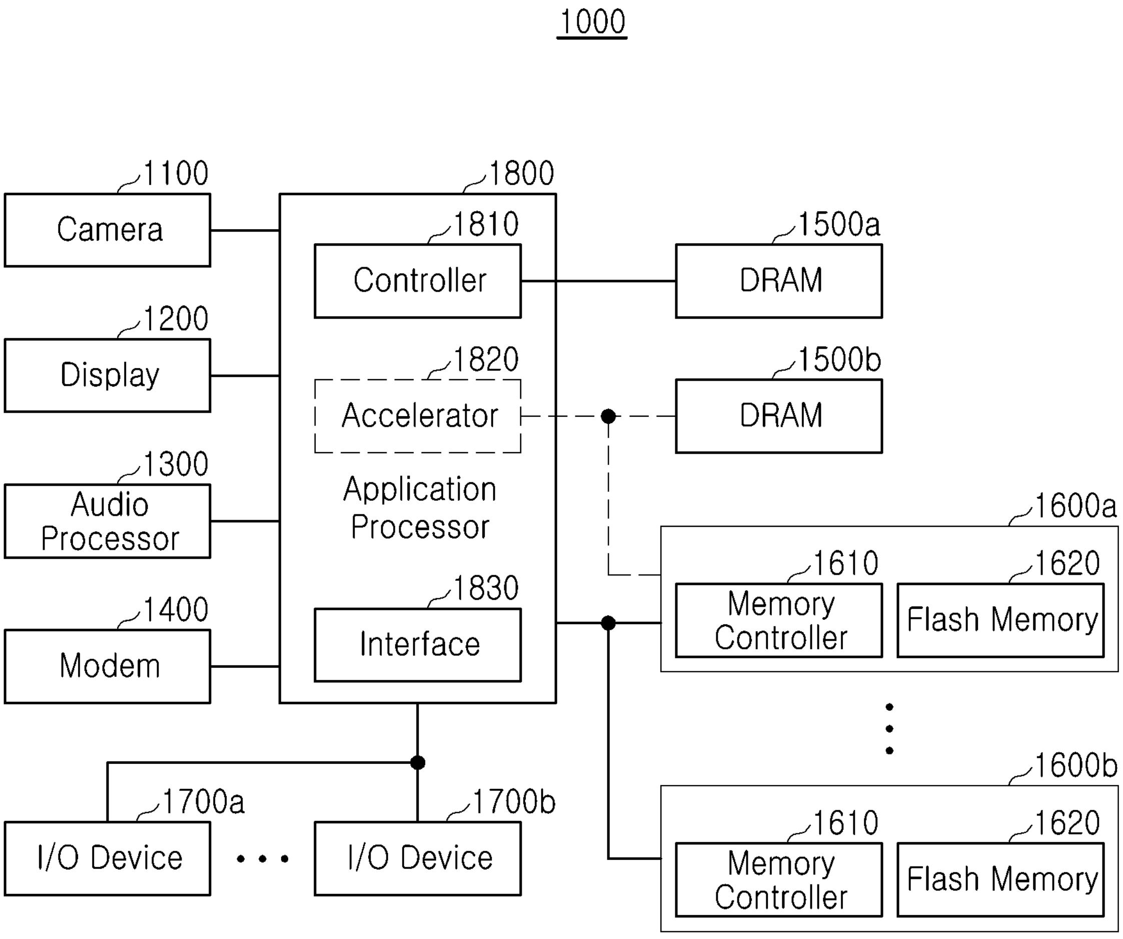
FIG. 13 is a schematic block diagram illustrating a memory device according to an example embodiment of the present disclosure.

FIG. 13 is a diagram illustrating a memory device according to an example embodiment.

Referring to FIG. 13, a system 1000 may include a camera 1100, a display 1200, an audio processing unit (i.e., audio processor) 1300, a modem 1400, DRAMs 1500*a* and 1500*b*, flash memories 1600*a* and 1600*b*, each of which may include a memory controller 1610 and a flash memory array 1620, input/output (I/O) devices 1700*a* and 1700*b*, and an application processor (hereinafter referred to as "AP") 1800. The system 1000 may be implemented, for example, as a smartphone, a tablet personal computer, a wearable device, a healthcare device, or an Internet of Things (IoT) device, although embodiments are not limited thereto. Also, the system 1000 may be implemented as a server or a personal computer.

The camera 1100 may obtain still images or video images under control of a user, and may store the obtained image/video data or transmit the data to the display 1200. The audio processing unit 1300 may process audio data included in contents of the flash memories 1600*a* and 1600*b* or a network.

The modem 1400 may modulate and transmit signals for wired/wireless data transmission and reception, and may demodulate the signals to restore the signals to the original signals at the receiving end. The I/O devices 1700*a* and 1700*b* may include devices providing digital input and/or output functions, such as a universal serial bus (USB) or storage, digital camera, secure digital (SD) card, digital versatile disc (DVD), network adapter, a network adapter, a touch screen, or the like.

The AP 1800 may control overall operation of the system 1000. The AP 1800 may control the display 1200 such that a portion of the content stored in the flash memories 1600*a* and 1600*b* may be displayed on the display 1200. When the AP 1800 receives a user input through the I/O devices 1700*a* and 1700*b*, the AP 1800 may perform a control operation corresponding to a user input.

The AP 1800 may include an accelerator block, which is a dedicated circuit for AI (artificial intelligence) data computation, or may have an accelerator chip 1820 separately from the AP 1800. In addition to the accelerator block or the accelerator chip 1820, a DRAM 1500*b* may be mounted. An accelerator may be a functional block specializing in performing a specific function of the AP 1800. The accelerator may include a GPU, a functional block specializing in performing graphic data processing, an NPU (neural processing unit), a block specializing in performing AI calculation and inference, and a DPU (data processing unit), a block specializing in transmitting data.

The system 1000 may include the plurality of DRAMs 1500*a* and 1500*b*. The AP 1800 may control the DRAMs 1500*a* and 1500*b* through commands and mode register (MRS) settings conforming to the joint electron device engineering council (JEDEC) standard specifications, or may communicate by setting the DRAM interface protocol to use unique functions of company such as low voltage/high speed/reliability and cyclic redundancy check (CRC)/error correction code (ECC) functions. For example, the AP 1800 may communicate with the DRAM 1500*a* with an interface complying with JEDEC standard specifications, and the accelerator block or the accelerator chip 1820 may communicate by setting a new DRAM interface specification to control the DRAM 1500*b* for accelerator which has a bandwidth higher than that of the DRAM 1500*a*.

Only the DRAMs 1500*a* and 1500*b* are illustrated in FIG. 13, but an example embodiment thereof is not limited thereto, and any memory such as PRAM, SRAM, MRAM, RRAM, FRAM, or Hybrid RAM memory may be used as long as the memory satisfies the conditions of a bandwidth, response speed, and voltage of the AP 1800 or the accelerator chip 1820.

The DRAMs 1500*a* and 1500*b* may have a delay time and bandwidth relatively smaller than those of I/O devices 1700*a* and 1700*b* or flash memories 1600*a* and 1600*b*. The DRAMs 1500*a* and 1500*b* may be initialized at the power-on time of the system 1000, and an operating system and application data may be loaded, and may be used as a temporary storage position for the operating system and application data or as an execution space for various software codes.

In the DRAMs 1500*a* and 1500*b*, arithmetic operations such as addition/subtraction/multiplication/division, vector computation, address computation, or fast Fourier transform (FFT) computation may be performed. Also, in the DRAMs 1500*a* and 1500*b*, a function for performing inference may be performed. Here, inference may be performed in a deep learning algorithm using an artificial neural network. The deep learning algorithm may include a training operation of learning a model through various data and an inference operation of recognizing data with the learned model.

For example, an image captured by a user through a camera 1100 may be signal-processed and may be stored in the DRAM 1500*b*, and the accelerator block or the accelerator chip 1820 may perform AI data computation of recognizing data using the data stored in the DRAM 1500*b* and a function used for inference.

The system 1000 may include a plurality of storage having a capacity larger than that of the DRAMs 1500*a* and 1500*b* or a plurality of flash memories 1600*a* and 1600*b*. The accelerator block or accelerator chip 1820 may perform a training operation and AI data computation using the flash memories 1600*a* and 1600*b*. As an example embodiment, the flash memories 1600*a* and 1600*b* may more efficiently perform a training operation and inference AI data computation performed by the AP 1800 and/or the accelerator chip 1820 using the computation memory device provided in the memory controller 1610. The flash memories 1600*a* and 1600*b* may store pictures taken through the camera 1100 or data transmitted through a data network. For example, the flash memories 1600*a* and 1600*b* may store augmented reality/virtual reality, high definition (HD), or ultra-high definition (UHD) content.

Memory devices such as the camera 1100, the display 1200, the audio processing unit 1300, the modem 1400, the DRAMs 1500*a* and 1500*b*, the flash memories 1600*a* and 1600*b*, the I/O devices 1700*a* and 1700*b* and the AP 1800 included in the system 1000 may include components of the first memory device 100 and/or the second memory device 200 according to an example embodiment in FIG. 1.

Accordingly, using the CRC code, it may be determined whether an error has occurred in the process of transmitting data through a channel, and also, by reflecting the sampled error position estimation data to the reception data based on a probability of error in each bit position, generating a comparison CRC code and comparing the code with the reception CRC code, the error may be corrected.

According to the aforementioned example embodiments, an electronic memory device may determine whether an error has occurred in the data using the CRC code, and when it is determined that an error has occurred, the device may correct the error in the data using the CRC code. Accordingly, an error correction code (ECC) provided separately from the CRC code may be unnecessary. Also, the electronic memory device may change the length of the CRC code. When the length of the CRC code is reduced, the bits corresponding to the reduced length of the CRC code may be available for use as metadata.

While the example embodiments have been illustrated and described above, it will be configured as apparent to those skilled in the art that modifications and variations could be made without departing from the scope of the present disclosure as defined by the appended claims.

What is claimed is:

1. An electronic memory device, comprising:

a CRC checker configured to receive reception data and a cyclic redundancy check (CRC) codeword including a reception CRC code, to derive a comparison CRC code from the reception data, and to determine whether the reception CRC code and the comparison CRC code are the same; and an error position estimation data sampler configured to sample error position estimation data indicative of an estimated position of an error in the reception data and to transmit the error position estimation data to the CRC checker when the reception CRC code and the comparison CRC code are not the same, wherein the CRC checker is configured to recalculate the comparison CRC code as a function of the error position estimation data, and to correct the error in the reception data reflected by the error position estimation data when the reception CRC code and the recalculated comparison CRC code are the same.

2. The electronic memory device of claim 1, wherein the CRC checker is configured to recalculate the comparison CRC code from data obtained by subtracting the error position estimation data from the reception data.

3. The electronic memory device of claim 1, wherein the error position estimation data sampler is configured to sample new error position estimation data indicative of a new estimated position of an error in the reception data when the reception CRC code and the recalculated comparison CRC code are not the same.

4. The electronic memory device of claim 3, wherein the CRC checker is configured to recalculate the comparison CRC code as a function of the new error position estimation data, and to determine whether the reception CRC code and the recalculated comparison CRC code are the same.

5. The electronic memory device of claim 3, wherein the error position estimation data sampler is configured to sample the error position estimation data and the new error position estimation data based on a probability of error associated with each bit position of the reception data.

6. The electronic memory device of claim 5, wherein the probability of error corresponding to the error position estimation data is higher than the probability of error corresponding to the new error position estimation data.

7. The electronic memory device of claim 3, wherein, in the error position estimation data, a bit among a plurality of bits corresponding to the estimated position of an error in the reception data, is "1".

8. The electronic memory device of claim 7, wherein, in the error position estimation data, a least significant bit among the plurality of bits is "1".

9. The electronic memory device of claim 3, wherein the error position estimation data sampler is configured to generate the new error position estimation data by multiplying the error position estimation data by "2".

10. The electronic memory device of claim 3, wherein the error position estimation data sampler is configured to generate the new error position estimation data by shift-computing a plurality of bits of the error position estimation data.

11. The electronic memory device of claim 10, wherein the error position estimation data sampler is configured to generate the new error position estimation data by inserting "0" to an end of the error position estimation data a number of times corresponding to a number of shift-computed bits.

12. The electronic memory device of claim 10, wherein the error position estimation data sampler is configured to generate the new error position estimation data by inserting at least one bit output from one end of the error position estimation data into an opposite end of the error position estimation data by shift-computation.

13. The electronic memory device of claim 1, wherein a length of the reception data is the same as a length of the error position estimation data.

14. An electronic memory device, comprising:

a linear feedback shift register (LFSR) including an N number of exclusive-OR (XOR) gates, an N number of flip-flops, an N number of first switches, an (N−1) number of second switches and a third switch connected between a transmission data input terminal and a transmission CRC code output terminal, wherein the N number of XOR gates, the N number of flip-flops, and the (N−1) number of second switches are connected to each other alternately, where N is a natural number;

a bit data generator configured to output N-bit data controlling a degree K of a CRC polynomial and K-bit data according to values of a coefficient of the CRC polynomial, where K is a natural number, wherein each of the N number of first switches connects the transmission CRC code output terminal to a corresponding XOR gate among the N number of XOR gates in a turned-on state of the N number of first switches, wherein each of the (N−1) number of second switches connects an output terminal of a flip-flop of an adjacent preceding stage among the N number of flip-flops to an input terminal of an XOR gate of an adjacent subsequent stage among the N number of XOR gates in a first turned-on state, and connects the output terminal of the flip-flop of the adjacent preceding stage to a first node in a second turned-on state, wherein the third switch connects the first node to the transmission CRC code output terminal in a turned-on state, and wherein the linear feedback shift register is configured to control states of the N number of first switches, the (N−1) number of second switches, and the third switch, and to derive the transmission CRC code from the transmission data by controlling a state of at least one first switch among the N number of first switches, which is in the turned-on state of the at least one first switch among the N number of first switches, by the N-bit data.

15. The electronic memory device of claim 14, wherein, when a bit of the N-bit data is "1," the linear feedback shift register is configured to control a corresponding first switch among the N number of first switches to be in the turned-on state of the corresponding first switch among the N number of first switches, and to control a corresponding second switch among the (N-1) number of second switches to be in the first turned-on state of the corresponding second switch among the (N-1) number of second switches, and wherein, when a bit of the N-bit data is "0," the linear feedback shift register is configured to control a corresponding first switch among the N number of first switches to be in a turned off-state, and to control a corresponding second switch among the (N-1) number of second switches to be in the second turned-on state of the corresponding second switch among the (N-1) number of second switches.

16. The electronic memory device of claim 15, wherein the linear feedback shift register is configured to control the third switch to be in the turned-on state of the third switch when at least one bit of the N-bit data is "0".

17. The electronic memory device of claim 14, wherein a length of the K-bit data is equal to or less than a length of the N-bit data.

18. The electronic memory device of claim 17, wherein, when a length of the K-bit data is less than a length of the N-bit data, (N−K) bits are used as metadata.

19. An electronic memory device, comprising:

a reception portion configured to receive a plurality of data blocks;

a data block reassembly portion configured to classify the plurality of data blocks into at least one first data block, a second data block including a reception CRC code corresponding to the at least one first data block, and at least one third data block; and a CRC decoder configured to generate a comparison CRC code from the at least one first data block, and to determine whether the at least one first data block includes an error by comparing the reception CRC code with the comparison CRC code, wherein, when the reception CRC code and the comparison CRC code are not the same, the CRC decoder samples an error position estimation data block including error position estimation data indicative of an estimated position of the error in the at least one first data block, and recalculates the comparison CRC code as a function of the error position estimation data, and wherein, when the reception CRC code and the recalculated comparison CRC code are the same, the CRC decoder corrects the error in the at least one first data block as a function of the error position estimation data.

20. The electronic memory device of claim 19, wherein a length of the second data block is fixed, and wherein, when a length of the reception CRC code is less than a length of the second data block, the second data block includes additional metadata in a remainder section not used by the reception CRC code.

* * * * *